United States Patent
Johansson et al.

(10) Patent No.: US 10,900,533 B2
(45) Date of Patent: Jan. 26, 2021

(54) COUPLING DEVICE, SUPPORT STRUCTURE AND METHODS

(71) Applicant: ABB Schweiz AG, Baden (CH)

(72) Inventors: Axel Johansson, Solna (SE); Daniel Backström, Västerås (SE); Patrik Ortenmark, Köping (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 16/615,594

(22) PCT Filed: May 31, 2017

(86) PCT No.: PCT/EP2017/063185
§ 371 (c)(1),
(2) Date: Nov. 21, 2019

(87) PCT Pub. No.: WO2018/219451
PCT Pub. Date: Dec. 6, 2018

(65) Prior Publication Data
US 2020/0149605 A1    May 14, 2020

(51) Int. Cl.
*E04B 1/98* (2006.01)
*F16F 7/12* (2006.01)
(Continued)

(52) U.S. Cl.
CPC ............... *F16F 7/12* (2013.01); *E04H 9/021* (2013.01); *F16F 3/02* (2013.01); *H02B 1/54* (2013.01);
(Continued)

(58) Field of Classification Search
None
See application file for complete search history.

(56) References Cited

U.S. PATENT DOCUMENTS

| 3,724,603 A | 4/1973 | Shiomi et al. |
| 3,973,078 A | 8/1976 | Wolf et al. |

(Continued)

FOREIGN PATENT DOCUMENTS

| CN | 1084782 A | 4/1994 |
| CN | 2172370 Y | 7/1994 |

(Continued)

OTHER PUBLICATIONS

International Preliminary Report on Patentability Application No. PCT/EP2017/063185 Completed: Aug. 14, 2019 17 pages.

(Continued)

*Primary Examiner* — Basil S Katcheves
(74) *Attorney, Agent, or Firm* — Slater Matsil, LLP (57) ABSTRACT

A coupling device including two support members; a joint connecting the two support members and allowing relative rotation between the support members about at least one rotational axis; and at least one damping element connecting the two support members in parallel with the joint; wherein the at least one damping element is configured to deform plastically by a relative rotation between the support members about the at least one rotational axis. A support structure for supporting a mass, a method for adjusting the stiffness of a coupling device and a method for providing stiffness to a coupling device are also provided.

25 Claims, 4 Drawing Sheets

(51) Int. Cl.
  *E04H 9/02* (2006.01)
  *F16F 3/02* (2006.01)
  *H02B 1/54* (2006.01)

(52) U.S. Cl.
  CPC ...... *E04H 9/024* (2013.01); *F16F 2230/0005* (2013.01); *F16F 2230/0023* (2013.01); *F16F 2234/06* (2013.01); *F16F 2238/04* (2013.01)

(56) References Cited

U.S. PATENT DOCUMENTS

| | | | | |
|---|---|---|---|---|
| 4,766,708 | A * | 8/1988 | Sing | E04B 1/98 52/167.8 |
| 5,790,388 | A | 8/1998 | Buckingham | |
| 5,971,374 | A | 10/1999 | Freeman | |
| 8,001,734 | B2 * | 8/2011 | Pryor | E04B 1/2403 52/167.3 |
| 2012/0038091 | A1 | 2/2012 | Tagawa | |
| 2012/0304587 | A1 * | 12/2012 | Kenho | E04H 9/021 52/699 |
| 2014/0115979 | A1 | 5/2014 | Kenho | |

FOREIGN PATENT DOCUMENTS

| | | |
|---|---|---|
| CN | 104852603 A | 8/2015 |
| EP | 0634765 A1 | 1/1995 |
| EP | 2933815 A2 | 10/2015 |
| FR | 2169997 A1 | 9/1973 |
| FR | 2359734 A1 | 2/1978 |
| WO | 9412806 A1 | 6/1994 |
| WO | 2016046104 A1 | 3/2016 |

OTHER PUBLICATIONS

International Search Report and Written Opinion of the International Searching Authority Application No. PCT/EP2017/063185 Completed: Feb. 15, 2018; dated Feb. 23, 2018 12 pages.
Chinese Search Report, Chinese Application No. 2017800910935, ABB, dated May 18, 2020, 3 pages.

* cited by examiner

COUPLING DEVICE, SUPPORT STRUCTURE AND METHODS

TECHNICAL FIELD

The present disclosure generally relates to coupling devices. In particular, a coupling device comprising a joint and at least one damping element in parallel with the joint, a support structure for supporting a mass, wherein the support structure comprises at least one coupling device, a method for adjusting the stiffness of a coupling device and a method for providing stiffness to a coupling device, are provided.

BACKGROUND

High voltage equipment requires a large insulation distance to the ground. When the equipment is placed standing on the ground, such as on the floor, long post insulators are required between the equipment and the ground. The equipment can be heavy, e.g. 20 to 30 metric tons, and the bending moments in the post insulators can be very high, especially during seismic events. The post insulators have a tendency to not be capable of handling these bending loads. For mechanical reasons, it may not be appropriate to transfer these large bending moments to the attachment points of the post insulators. One alternative is therefore to use fully flexible joints between the post insulators and the high voltage equipment and/or between the post insulators and the ground.

It is also known to handle these loads by using stiff cross bracings. This may be done by attaching stiff insulators in a cross configuration between the, typically four, post insulators and seismic loads may be absorbed by tension and/or compression of the cross bracing insulators instead of bending moment in the post insulators.

CN 104852603 A describes a multi-level voltage source current converter valve tower. The tower is supported by a support structure comprising a plurality of vertical insulators. Cross bracings are arranged between the vertical insulators.

SUMMARY

By coupling a post insulator to a fully flexible joint, the load carrying capacity of the post insulators may not be fully utilized. In case a coupling device comprises a joint and one or more hydraulic dampers to damp movements of the joint, problems with leakage may occur and the hydraulic damper will need service. Hydraulic dampers are also expensive.

By using insulators arranged as a cross bracing between the post insulators, very high loads are introduced to the cross bracing insulators and to the attachment points thereof. For high seismic levels, this solution is not applicable.

One object of the present disclosure is to provide a simple coupling device with a damping function.

A further object of the present disclosure is to provide a cheap coupling device with a damping function.

A still further object of the present disclosure is to provide a reliable coupling device with a damping function having a long service life.

A still further object of the present disclosure is to provide a coupling device having easily adjustable damping characteristics.

A still further object of the present disclosure is to provide a coupling device that enables the load carrying capacity of posts of a support structure to be better utilized without introducing too high bending moments in the posts.

A still further object of the present disclosure is to provide a support structure for a mass, such as a high voltage unit, that can withstand high levels of seismic forces.

A still further object of the present disclosure is to provide a method for adjusting the stiffness of a coupling device solving one or more of the foregoing objects.

A still further object of the present disclosure is to provide a method for providing stiffness to a coupling device solving one or more of the foregoing objects.

According to one aspect, there is provided a coupling device comprising two support members; a joint connecting the two support members and allowing relative rotation between the support members about at least one rotational axis; and at least one damping element connecting the two support members in parallel with the joint; wherein the at least one damping element is configured to deform plastically by a relative rotation between the support members about the at least one rotational axis.

By allowing the at least one damping element to deform plastically, a damping function is introduced to the coupling device. When the at least one damping element deforms plastically, relative movements between the two support members about the at least one rotational axis (e.g. tilting movements) can be damped.

Kinetic energy from relative movements of the support members can thereby be transformed to plastic work of the at least one damping element. The phase of elastic (i.e. reversible) deformation of the at least one damping element reflects the stiffness of the coupling device and the phase of plastic (i.e. irreversible) deformation of the at least one damping element reflects the damping characteristic of the coupling device.

In case the coupling device is to be attached to a post, such as a post insulator, the at least one damping element can easily be dimensioned for a particular moment transfer to a mounting point, e.g. to which the post or the coupling device is mounted. Furthermore, if the coupling device is used in a support structure for supporting a mass, such as a high voltage unit, the at least one damping element can easily be dimensioned to accomplish a desired stiffness (e.g. Eigen frequency) of a system comprising the mass and the support structure. One or more damping elements of the coupling device may be replaced after plastic deformation.

Although the coupling device is mainly described in connection with post insulators for supporting a high voltage unit, the coupling device according to the present disclosure may be used in other applications. The coupling device may thus constitute an independent machine element.

Each of the at least one rotational axis may be substantially perpendicular to a direction between (e.g. a separating direction of) the two support members. Each support member may be substantially planar, e.g. constituted by or comprising a plate. In case the support members are planar, each of the at least one rotational axis may be substantially parallel with the extension planes of the support members when the coupling device is in a neutral position. The two support members may be aligned along the direction between the support members. For example, in case the support members are constituted by rectangular or square plates, the plates may be parallel and rotationally aligned along the direction between the plates.

Each of the at least one damping element may be arranged at the periphery of the support members. For example, each damping element may be substantially flush with an outer edge of each support member or each damping element may be connected to an outer side of each support member. Each damping element may be connected to each support member by one or more fastening elements, such as screws. According to one variant, each damping element is connected to the support members with only one fastening element associated with each support member.

The joint of the coupling device may constitute the main load carrying component of the coupling device. The joint may be constituted by a flexible joint having one or more angular degrees of freedom. The coupling device according to the present disclosure may alternatively be referred to as a mechanically damped joint. The joint may be centered with respect to the support members.

The coupling device according to the present disclosure has a simple design that enables a cheap production and a long service life. According to one variant, the entire coupling device is made of metal. The coupling device may still function satisfactory if the coupling device would rust over time. The at least one damping element may be made of metal, such as steel, or of an alternative material, such as fiberglass or another composite material. For electric applications, at least the joint and the at least one damping element may be made of an insulating material as an alternative to metal.

The joint of the coupling device may be constituted by a universal joint. Although universal joints are most commonly associated with cardan joints, a universal joint according to the present disclosure may be any type of joint comprising at least two degrees of angular freedom. Thus, a universal joint as used herein may alternatively be referred to as a pivoting member comprising at least two degrees of angular freedom. As a further example in addition to a cardan joint, a universal joint may be constituted by a ball joint.

The universal joint may define two rotational axes to allow relative rotation between the support members about the at least one rotational axis. The at least one rotational axis may thus be constituted by the two rotational axes defined by the universal joint. The universal joint may be constituted by a cardan joint. The cardan joint may comprise two hinges which may be perpendicular to each other.

The coupling device may further comprise two ears connected to, or integrally formed with, a first (e.g. an upper) of the two support members and two ears connected to, or integrally formed with, a second (e.g. a lower) of the two support members. The coupling device may also comprise a bearing in each ear in which a pivot can be received. Such pivot may for example be formed on a cardan cross or on a center block of the joint.

The coupling device may further comprise one or two yokes comprising two of the ears. For example, two ears may be connected to a first support member via a first yoke and two ears may be connected to a second support member via a second yoke.

Throughout the present disclosure, the damping elements of the coupling device may be constituted by brackets. By varying the geometry, such as the shape and/or the dimensions, of the damping elements, the elastic and plastic characteristics of the at least one damping element can be optimized.

The at least one damping element may comprise two damping elements arranged on opposing sides of the joint. That is, the joint may be arranged between at least two damping elements.

The at least one damping element may comprise four damping elements arranged on four sides of the joint. The coupling device may for example comprise at least one damping element on each side of the joint along a first of the at least one rotational axis and at least one damping element on each side of the joint along a second of the at least one rotational axis. According to one variant, the coupling device comprises eight damping elements, two on each of four sides of the joint.

The at least one damping element may be substantially C-shaped. C-shaped damping elements may alternatively be referred to as C-shaped brackets. A substantially C-shaped damping element may for example be constituted by a damping element having the shape of a semicircle, by a damping element comprising three substantially straight sections angled relative to each other or by a damping element comprising three substantially straight sections and two intermediate curved sections. With at least one substantially C-shaped damping element, the coupling device tends to self-center.

In case the coupling device comprises two or more substantially C-shaped damping elements, the damping elements may be arranged in the same direction with respect to a circumference of the coupling device. For example, each C-shaped damping element may be arranged to face (e.g. with the opening of the C-shape) in the clockwise direction (or counterclockwise direction), as seen from above. In this regard, the plane of the circumference of the coupling device may be perpendicular to the direction between the two support members.

According to a further variant, a pair of two substantially C-shaped damping elements may be arranged on each of four sides of the coupling device. In this case, the damping elements of each pair may be arranged to face each other, e.g. face each other with the opening of the C-shape.

The at least one damping element may be substantially planar. In this case, the at least one damping element may be arranged in a plane substantially perpendicular to one of the at least one rotational axis.

The at least one damping element may be constituted by a single piece of material. The damping elements may for example be cut out from a steel sheet by a laser or water cutting process. In this way, the dimensions and shape of the damping elements can easily be controlled to achieve the desired damping characteristics of the coupling device.

The at least one damping element may be constituted by a stack of plates. By adding or removing one or more plates to or from the stack, the geometry, and consequently the damping characteristics, of the at least one damping element can be adjusted. Also in this variant, each plate of the damping element stack may be cut out from a steel sheet by a laser or water cutting process. Moreover, the plates of the stack may have the same or different dimensions. Regardless of whether or not the at least one damping element is constituted by a stack of plates, the at least one damping element may have a thickness of 2 mm to 25 mm, such as 5 mm to 20 mm, such as 10 mm to 15 mm.

According to a further aspect, there is provided a support structure for supporting a mass, the support structure comprising a plurality of posts for supporting the mass on a support surface; and at least one coupling device according the present disclosure; wherein at least one of the posts is connected to one of the at least one coupling device to damp rotation of the at least one of the posts about the at least one rotational axis. The at least one coupling device may be directly or indirectly (e.g. by means of one or more intermediate components) connected to an associated post. The support structure may for example be used to carry the vertical load of the mass. According to one variant, each post is arranged to support the mass via at least one coupling device.

Due to the plastic deformation of the at least one damping element of the coupling device when the support members reach a certain relative angular position about the at least one rotational axis, angular displacement of the coupling device can be limited. As a consequence, the posts to which a coupling device is connected are allowed to rotate to some extent (about the at least one rotational axis) before the rotation is limited by the damping of an associated coupling device. Thereby, lateral sway of the support structure, for example induced by a seismic event, can be reduced.

The support structure according to this aspect is relatively flexible due to the energy absorption of the one or more damping elements of the at least one coupling device during a seismic event. In comparison with prior art solutions for high voltage units, the support structure can absorb higher seismic forces without mechanical failure.

The at least one coupling device may be arranged in various ways in the support structure in order to damp movements of the structure. The at least one coupling device may for example be arranged between the mass and one of the at least one post and/or between the support surface and one of the at least one post. Intermediate components may be provided between the at least one coupling device and the mass and/or the support surface.

The support structure according to this aspect may be used in various implementations. According to one variant, the mass is constituted by a high voltage unit and the posts are constituted by post insulators. For example, the plurality of post insulators may comprise four post insulators, the at least one coupling device may comprise four coupling devices, and each coupling device may be connected to one of the post insulators. The initial rotation of the post insulators, i.e. when the at least one damping element of the at least one coupling device deforms elastically but not yet plastically, is beneficial since the high voltage unit and the post insulators may be sensitive for large bending moments.

The post insulators may be oriented substantially vertically, or inclined, such as at least 5°, such as at least 10°, with respect to a vertical axis. A post insulator according to the present disclosure may alternatively be referred to as an insulated rod, insulated bar, insulated column or insulated strut. The post insulators have an elongated appearance and may be substantially straight. The post insulators function to electrically insulate the high voltage unit from electrical ground, i.e. from the support surface. The post insulators may for example be made of porcelain or epoxy. A high voltage unit comprising a light valve and epoxy beams is sensitive to large bending moments.

The support structure according to the present disclosure may be constituted by a standing support structure. The support structure and the high voltage unit may be comprised by a high voltage system. The high voltage system may comprise a plurality of support structures and a high voltage unit associated with each support structure. The system may constitute, or constitute a part of, a high voltage direct current (HVDC) power transmission installation.

In case the high voltage system (or another similar system using the support structure) is subjected to a seismic event, some of the energy from the seismic impulses will be transformed into plastic work of the damping elements and dampen the support structure. A reduction of the lateral sway of such support structure is useful in order to protect the high voltage unit from stresses that may damage the high voltage unit and if the high voltage system comprises several high voltage units arranged adjacent to each other.

The behavior of the support structure may be optimized by adjusting the geometry (e.g. shape and/or dimension) of the damping elements of the at least one coupling device. In this way, deflection of the structure and/or moment transfer by the post insulators can be optimized. The provision of at least one coupling device according to the present disclosure to the support structure may eliminate or reduce the need for stiff cross bracings to handle the bending moments in the post insulators.

The at least one coupling device may be connected to the lower end and/or the upper end of an associated post. According to one variant, the support structure comprises four posts and one or two (e.g. upper and/or lower) coupling devices associated with each post.

In case the posts are constituted by post insulators to support a mass in the form of a high voltage unit and a coupling device is provided at the top of each post insulator, a further insulating element, such as a shorter post insulator, may be provided between the coupling device and the high voltage unit in order to avoid electrical phenomenon.

The high voltage unit according to the present disclosure may for example be constituted by a HVDC semiconductor valve structure. Further examples of high voltage units are capacitor and breaker applications. A high voltage within the present disclosure may be a voltage of at least 100 kV. Thus, a high voltage system according to the present disclosure may have a system voltage of at least 100 kV.

In case the support structure is used for a high voltage system, the support surface may be constituted by a valve hall floor. However, in case the high voltage system is arranged in a valve hall, the support surface may or may not be constituted by a valve hall floor. The support surface may for example be constituted by a part of a valve carrying scaffold. The support surface may be planar. In addition, the support surface may be horizontal or substantially horizontal.

In addition to the at least one coupling device, the support structure may further comprise at least one elastic element configured to bias or force the support structure into a neutral position, e.g. an upright position. In this manner, a mechanical spring effect may be created. During lateral sway of the support structure, the at least one elastic element deforms elastically and provides a restoring counter force, proportional to the deformation of the elastic element, forcing the support structure towards the neutral position.

The properties of the at least one elastic element and the characteristic of each of the at least one coupling device may be tuned to optimize the structural response of the support structure. In case no such elastic elements are provided, higher mechanical demands are put on the post insulators.

According to one variant, the support structure comprises one elastic element associated with each post insulator. According to a further variant, the support structure comprises one elastic element associated with several, or all, of the post insulators. In any case, the at least one elastic element may be arranged below, e.g. at the bottom of, each post insulator.

The at least one elastic element may be arranged functionally in series with the at least one coupling device. For example, if a post insulator is connected to the high voltage unit via a coupling device and connected to the support surface via an elastic element (or vice versa), the elastic element is arranged functionally in series with the at least one coupling device.

The at least one elastic element may be constituted by a plate arranged between the support surface and an associated post insulator and connected to the support surface and to the associated post insulator. One plate may be associated with each post insulator of the support structure, e.g. the support structure may comprise four post insulators and four plates. Each plate may be made of steel. As an alternative to plates, each of the at least one elastic element may be constituted by a matrix of mechanical coil springs.

According to a further aspect, there is provided a method for adjusting the stiffness of a coupling device. The method comprises providing a coupling device according to the present disclosure; adjusting the stiffness of the coupling device, by adding or removing at least one damping element connecting the two support members to or from the coupling device, or by changing configuration of at least one damping element connecting the two support members; wherein the at least one damping element is configured to deform plastically by a relative rotation between the support members about the at least one rotational axis. Thus, by adding a damping element to the coupling device, the coupling device can be made stiffer. By removing a damping element from the coupling device, the coupling device can be made softer. One example of changing configuration of the at least one damping element is to add or remove plates to or from a damping element constituted by a stack of plates.

According to a further aspect, there is provided a method for providing stiffness to a coupling device. The method comprises providing a coupling device comprising two support members and a joint connecting the two support members, wherein the joint allows relative rotation between the support members about at least one rotational axis; adding at least one damping element connecting the two support members to the coupling device in order to provide a stiffness to the coupling device; wherein the at least one damping element is configured to deform plastically by a relative rotation between the support members about the at least one rotational axis. The method according to this aspect thus provides for a simple and reliable retrofit of a damping function on a coupling device, e.g. comprising a fully flexible joint.

As used herein, a substantially perpendicular/parallel relationship includes a perfectly perpendicular/parallel relationship as well as deviations from a perfectly perpendicular/parallel relationship with up to 5%, such as up to 2%. Furthermore, a vertical direction as used herein refers to a direction aligned with the direction of the force of gravity and a horizontal direction refers to a direction perpendicular to the vertical direction.

BRIEF DESCRIPTION OF THE DRAWINGS

Further details, advantages and aspects of the present disclosure will become apparent from the following embodiments taken in conjunction with the drawings, wherein.

DETAILED DESCRIPTION

In the following, a coupling device comprising a joint and at least one damping element in parallel with the joint, a support structure for supporting a mass, wherein the support structure comprises at least one coupling device, a method for adjusting the stiffness of a coupling device and a method for providing stiffness to a coupling device, will be described. The same reference numerals will be used to denote the same or similar structural features.

Figure 1:
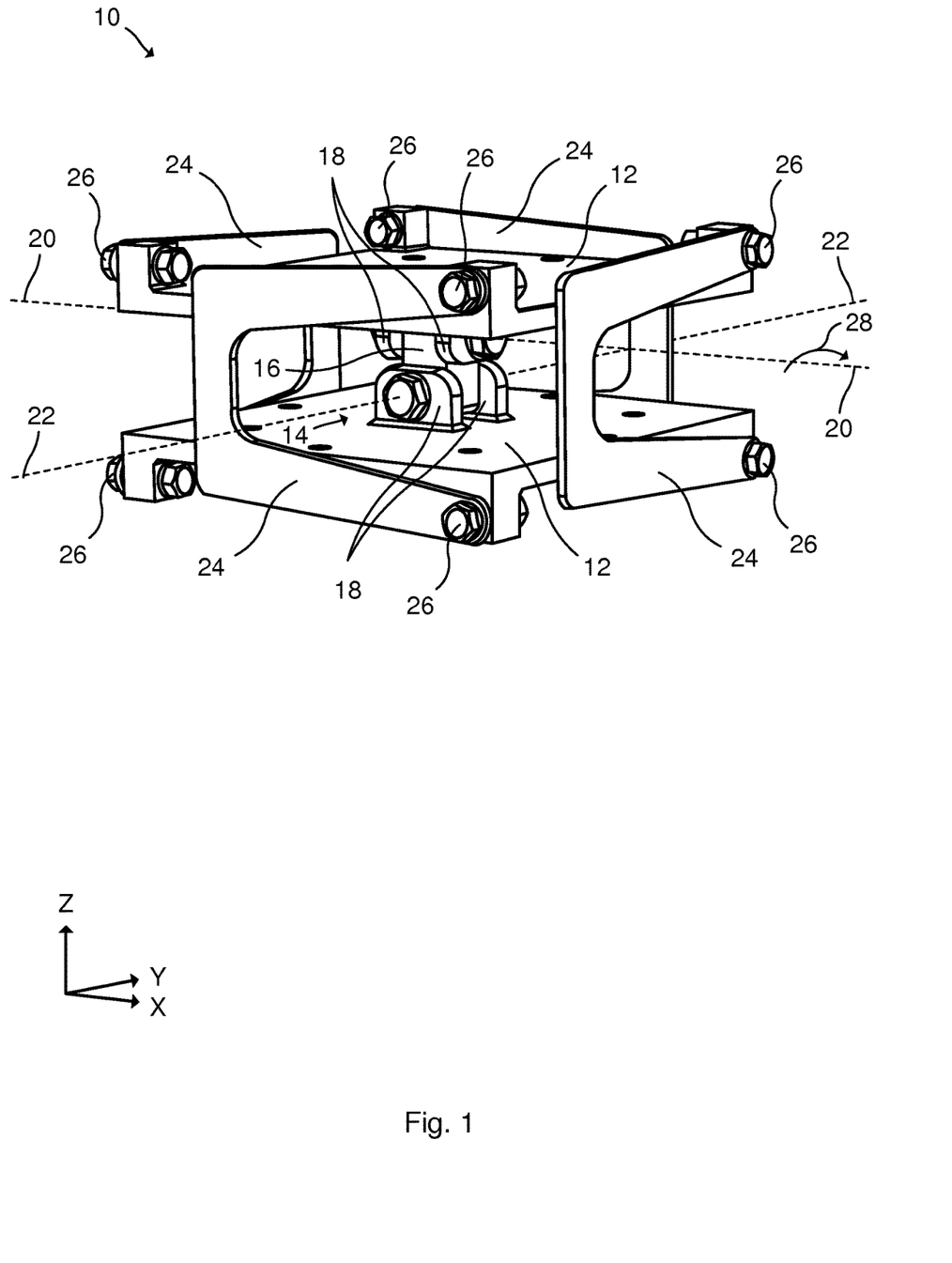
FIG. 1: schematically represents a perspective view of one example of a coupling device.

FIG. 1 schematically represents a perspective view of one example of a coupling device 10. In FIG. 1, the coupling device 10 is in a neutral position. The coupling device 10 comprises two support members 12 and a joint 14 connecting the two support members 12. FIG. 1 denotes a vertical axis Z, a first horizontal axis X and a second horizontal axis Y, perpendicular to the first horizontal axis X.

FIG. 1 further shows that the joint 14 is constituted by a universal joint 14. The joint 14 of this example comprises a center block 16 having four pivots (not denoted). The coupling device 10 further comprises four ears 18. Two upper ears 18 are connected to the upper support member 12 and two lower ears 18 are connected to the lower support member 12. Two of the pivots of the center block 16 are received in the two upper ears 18 and two of the pivots of the center block 16 are received in the two lower ears 18. Each ear 18 houses a bearing, e.g. a roller bearing or a needle bearing, for rotationally receiving a respective pivot. The joint 14 thereby defines two rotational axes 20, 22. The universal joint 14 of FIG. 1 is however merely one example and numerous alternative joints, including joints with only one rotational axis, may alternatively be employed.

The joint 14 allows the support members 12 to rotate with respect to each other about the rotational axis 20 parallel with the X-axis and to rotate with respect to each other about the rotational axis 22 parallel with the Y-axis. As a consequence, the support members 12 can tilt about any axis in the X-Y plane.

The support members 12 of the example in FIG. 1 are parallel, substantially planar and square. Thus, the main extension plane of each support member 12 is arranged in an X-Y plane. The support members 12 are also aligned along the Z-axis.

The coupling device 10 further comprises a plurality of damping elements 24. In the example of FIG. 1, the coupling device 10 comprises four damping elements 24 but fewer or more damping elements 24 may alternatively be employed.

As can be seen in FIG. 1, two of the damping elements 24 are arranged on opposite sides of the joint 14 along the rotational axis 20 and two of the damping elements 24 are arranged on opposite sides of the joint 14 along the rotational axis 22. Thus, one damping element 24 is arranged on each side of the coupling device 10.

The damping elements 24 of the example in FIG. 1 are made of metal and are cut from a single piece, e.g. by a laser or water cutting process. Each damping element 24 is substantially C-shaped by comprising three substantially straight sections angled relative to each other.

Each damping elements 24 is connected to both support members 12. In the example of FIG. 1, each damping element 24 is connected to a respective support member 12 by means of one screw 26. The screws 26 are attached through holes at each end of the C-shape of the damping element 24. Each support member 12 comprises a corresponding protrusion (not denoted) for receiving the screws 26. As can be seen in FIG. 1, the damping elements 24 are directed in the same direction along the circumference (i.e. the X-Y plane) around the coupling device 10, e.g. as seen from above. This provides for a self-centering of the coupling device 10 and a symmetric force absorption by the damping elements 24.

Depending on the configuration, the damping elements 24 may be compressed, tensioned and/or unloaded when the coupling device 10 is in the neutral position. As can be seen in FIG. 1, the damping elements 24 are substantially planar. The thickness of the damping elements 24 in this example is approximately 12 mm but may be varied. Two damping elements 24 are arranged in the X-Z plane and two damping elements 24 are arranged in the Y-Z plane.

By allowing the damping elements 24 to deform plastically, a damping function is introduced to the coupling device 10. The plastic deformation of the damping elements 24 gives a damping of relative movements between the support members 12.

For example, if the upper support member 12 is tilted clockwise about the rotational axis 20, as indicated by the arrow 28, the front damping element 24 along the rotational axis 20 is compressed, the rear damping element 24 along the rotation axis 20 is expanded, the front damping element 24 along the rotational axis 22 is expanded and the rear damping element 24 along the rotational axis 22 is compressed. Initially, the damping elements 24 deform elastically. However, at a certain degree of rotation, the damping elements 24 start to deform plastically. The damping elements 24 are thereby arranged to damp relative rotations between the support members 12 about at least one substantially horizontal axis (rotational axis 20 in this example).

The damping elements 24 are very simple to produce. By controlling the geometry of the damping elements 24, e.g. the thickness, the elastic and plastic characteristics of the damping elements 24 can be optimized. Thus, when producing the coupling device 10, a specific geometry of the damping elements 24 and the number of damping elements 24 may be selected to achieve certain damping characteristics of the coupling device 10 for a specific implementation. It is also very easy to replace one or more of the damping elements 24. Damping elements 24 according to the present disclosure may also be connected to similar coupling devices without any damping function.

Figure 2:
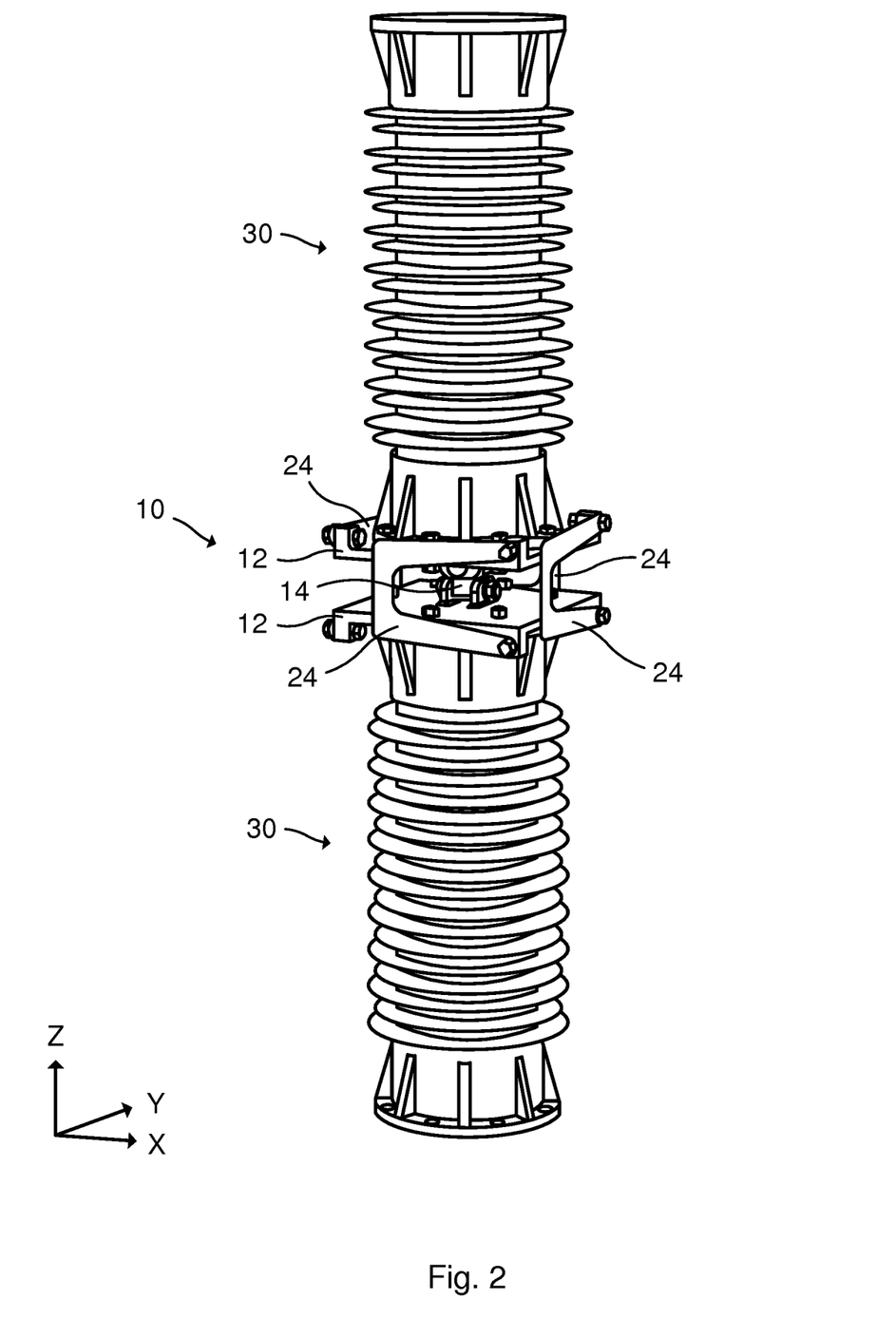
FIG. 2: schematically represents a perspective view of the coupling device in FIG. 1 connecting two post insulators.

FIG. 2 schematically represents a perspective view of the coupling device 10 in FIG. 1 in one exemplifying implementation. In FIG. 2, the coupling device 10 connects two posts exemplified as post insulators 30. The upper post insulator 30 is connected to the upper support member 12 of the coupling device 10 and the lower post insulator 30 is connected to the lower support member 12 of the coupling device 10. The two post insulators 30 are allowed to rotate to some extent relative to each other around any rotational axis in the X-Y plane until the rotation is damped by the plastic deformation of the damping elements 24.

Figure 3:
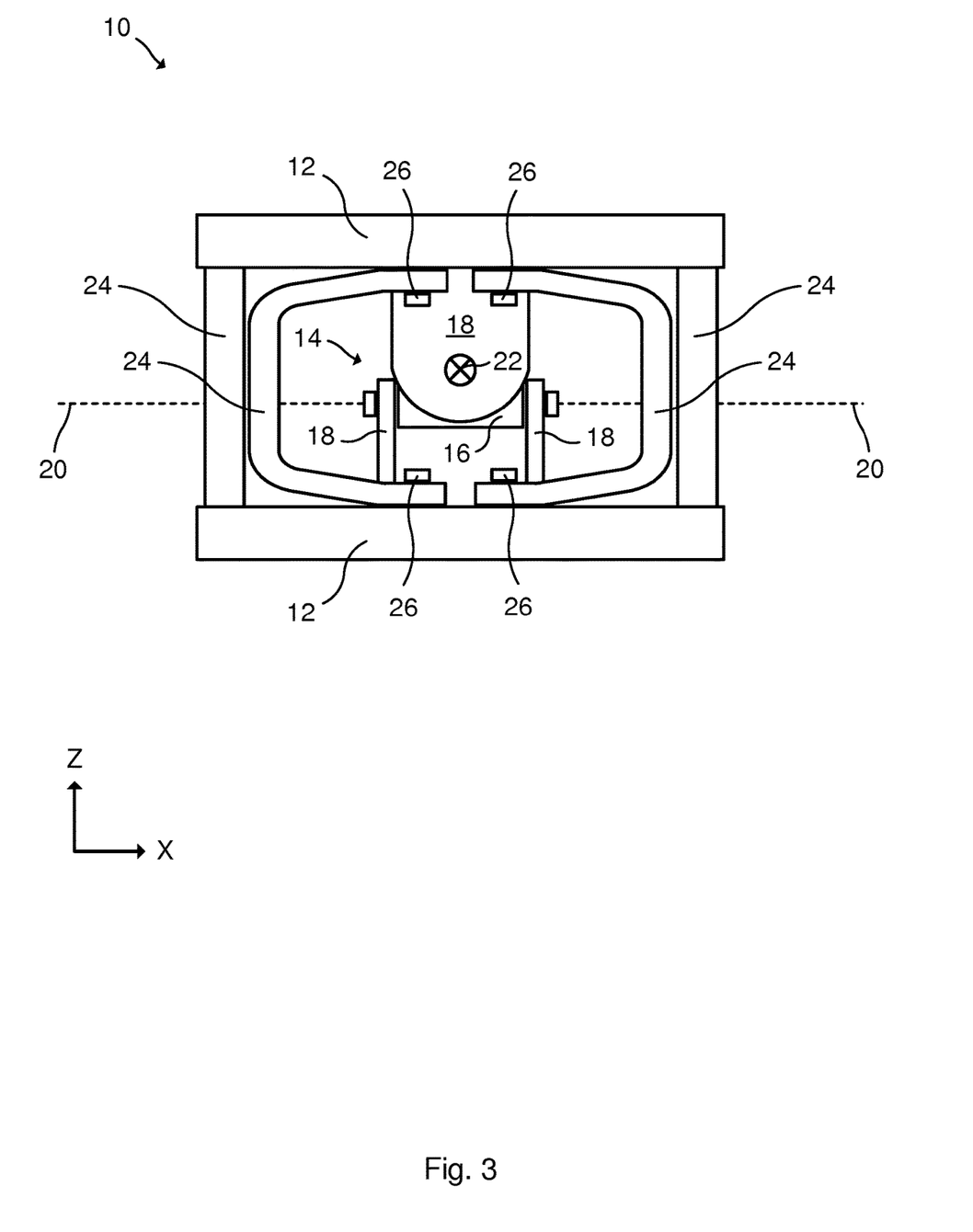
FIG. 3: schematically represents a side view of a further example of a coupling device.

FIG. 3 schematically represents a side view of a further example of a coupling device 10. Mainly differences with respect to FIG. 1 will be described.

The coupling device 10 of FIG. 3 comprises eight damping elements 24, two on each side of the coupling device 10. Also in this example, each damping element 24 is substantially C-shaped. In each pair of damping elements 24, the damping elements 24 are arranged to face each other. As can be seen in FIG. 3, the damping elements 24 are substantially flush with the outer edges of each support member 12.

Figure 4:
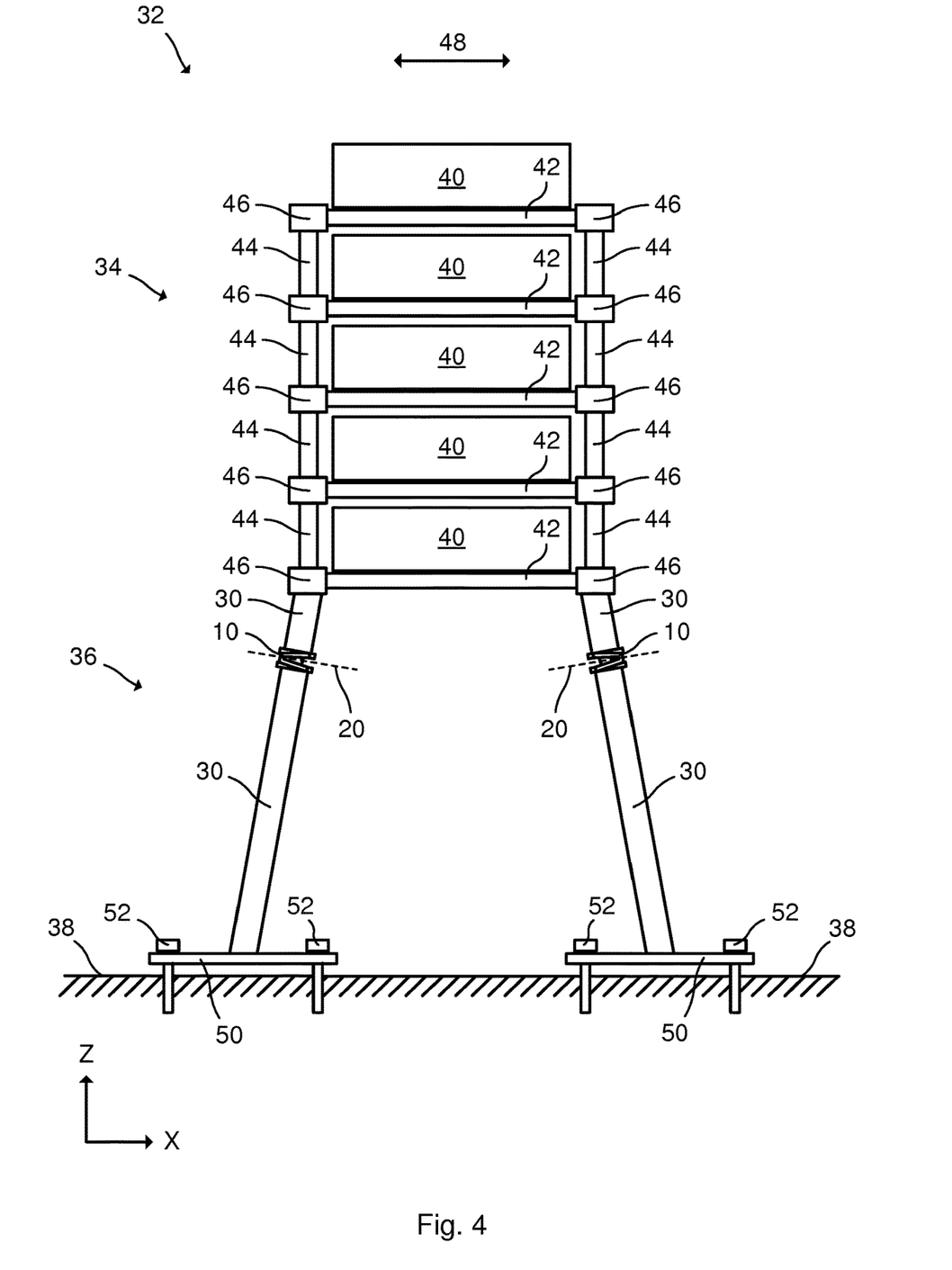
FIG. 4: schematically represents a side view of one example of support structure.

FIG. 4 schematically represents a side view of one example of a support structure 36. The support structure 36 of this example is comprised by a high voltage system 32 comprising a high voltage unit 34 and the support structure 36.

In FIG. 4, the support structure 36 is in a neutral position. The high voltage system 32 of this example is arranged in a hall having a support surface 38 constituted by a horizontal and planar hall floor.

The support structure 36 comprises four legs (only two are visible in FIG. 4). Each leg comprises a lower, relatively longer post insulator 30, an upper, relatively shorter post insulator 30 and an intermediate coupling device 10 connected to both the upper and lower post insulator 30.

The support structure 36 is arranged to support the high voltage unit 34 on the support surface 38. The support structure 36 in FIG. 4 is a standing support structure such that the entire gravity load of the high voltage unit 34 is transferred to the support surface 38 by four legs when no lateral forces are present.

The high voltage unit 34 may be a HVDC semiconductor valve structure. A typical length of the high voltage unit 34 is 7000 mm. The high voltage unit 34 of this example comprises several valve layers, each comprising two valve modules 40. An electric shield structure comprising a plurality of electric shields, such as corona shields, may be arranged around the valve layers of the high voltage unit 34 in order to lower the electrical fields to minimize the risk for partial discharge and/or flashover.

The high voltage unit 34 of this example further comprises a plurality of module supports 42, columns 44 and column supports 46. Each module support 42 supports two valve modules 40. The module supports 42 are stacked on each other by means of the columns 44. The module supports 42 are supported on the columns 44 via the column supports 46.

The high voltage unit 34 has a rectangular cross-section and one leg of post insulators 30 is associated with each corner of the high voltage unit 34. However, the high voltage unit 34 may have alternative shapes. The high voltage unit 34 may be subjected to hundreds of kilovolts.

Each lower post insulator 30 of this example is approximately five meters long. The post insulators 30 are made of an electrically insulating material, for example porcelain or epoxy. Both porcelain and epoxy are brittle and therefore sensitive to bending moments. The post insulators 30 establish an insulating distance for the high voltage unit 34 to ground, i.e. to the support surface 38. The post insulators 30 may for example be of the model 16SM510471 by Shemar.

In case of a seismic event, the high voltage system 32 is caused to sway laterally, as indicated by arrow 48. If any post insulator 30 is rotated such that a damping element 24 of an associated coupling device 10 is deformed plastically, the rotation will be damped. In the example in FIG. 4, tilting of a post insulator 30 about any axis perpendicular to the extension direction of the post insulator 30 can be damped by an associated coupling device 10. The high voltage unit 34 can thereby be maintained substantially vertically oriented. Moreover, smaller relative tilting movements (i.e. during elastic deformation of the damping elements 24) between the lower post insulators 30 and the high voltage unit 34 are not transmitted via the coupling device 10. This provides flexibility to the support structure 36.

The support structure 36 in FIG. 4 further comprises a plurality of elastic elements, here implemented as plates 50, configured to bias the support structure 36 back to the illustrated neutral position. A plurality of bolts 52 are provided to connect the plates 50 to the support surface 38. The plates 50 are raised from the support surface 38, e.g. approximately 30 mm, by means of the bolts 52.

The plates 50 may be made of metal, e.g. steel. One type of a steel suitable for the plates 50 is a high tensile steel having a tensile strength of at least 800 MPa. In this example, the plates 50 have a square profile of 1*1 meter and a thickness of approximately 20 mm. Simulations by the applicant have proven that the plates 50 may be designed to only deform elastically.

The plates 50 on which the post insulators 30 are mounted act as mechanical springs, deforming elastically and pushing the support structure 36 back to the neutral, straight-up position. By selecting thicker plates 50, e.g. having 25 mm thickness, the support structure 36 can be made stiffer. By selecting thinner plates 50, e.g. having 15 mm thickness, the support structure 36 can be made softer. Each plate 50 may be substantially flat in the neutral state of the support structure 36. When the downward force from one post insulator 30 is increased, the associated plate 50 is made concave, or made more concave.

The properties of the plates 50 and the characteristics of the one or more damping elements 24 of the coupling devices 10 may be tuned to optimize the structural response of the support structure 36. For example, the geometry, thickness and material of the plates 50 and/or of the damping elements 24 may be adjusted for this tuning purpose.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A support structure configured to support a high voltage unit, the support structure comprising:
   a plurality of post insulators configured to support the high voltage unit on a support surface, the plurality of post insulators comprising a first post insulator and a second post insulator; and
   at least one coupling device, wherein the at least one coupling device includes:
      two support members comprising a first support member and a second support member, each of the first and the second support members having a substantially planar structure, the first support member being connected to the first post insulator and the second support member being connected to the second post insulator;
      a joint connecting the two support members and allowing relative rotation between the two support members about at least one rotational axis; and
      at least one damping element connecting the two support members with the joint, wherein each of the two support members is connected to both the at least one damping element and the joint,
   wherein the at least one damping element is configured to deform plastically by a relative rotation between the two support members about the at least one rotational axis, and
   wherein the first post insulator is connected to one of the at least one coupling device to damp rotation of the first post insulator about the at least one rotational axis.

2. The support structure according to claim 1, wherein the joint is constituted by a universal joint.

3. The support structure according to claim 2, wherein the universal joint defines two rotational axes to allow relative rotation between the support members about the at least one rotational axis.

4. The support structure according to claim 1, wherein the at least one damping element includes two damping elements arranged on opposing sides of the joint.

5. The support structure according to claim 1, wherein the at least one damping element includes four damping elements arranged on four sides of the joint.

6. The support structure according to claim 1, wherein the at least one damping element is substantially C-shaped.

7. The support structure according to claim 1, wherein the at least one damping element is substantially planar.

8. The support structure according to claim 7, wherein the at least one damping element is arranged in a plane substantially perpendicular to one of the at least one rotational axis.

9. The support structure according to claim 1, wherein the at least one damping element is constituted by a single piece of material.

10. The support structure according to claim 1, wherein the at least one damping element is constituted by a stack of plates.

11. The support structure according to claim 1, wherein the at least one damping element has a thickness of 2 mm to 25 mm.

12. The support structure according to claim 1, wherein the at least one damping element has a thickness of 5 mm to 20 mm.

13. The support structure according to claim 1, wherein the at least one damping element has a thickness of 10 mm to 15 mm.

14. A method for adjusting the stiffness of a coupling device of a support structure, the method comprising:
   providing a support structure configured to support a high voltage unit, the support structure having;
   a plurality of post insulators configured to support the high voltage unit on a support surface, the plurality of post insulators comprising a first post insulator and a second post insulator; and
   at least one coupling device, wherein the coupling device includes:
      two support members comprising a first support member and a second support member, each of the first and the second support members having a substantially planar structure, the first support member being connected to the first post insulator and the second support member being connected to the second post insulator;
      a joint connecting the two support members and allowing relative rotation between the two support members about at least one rotational axis;
      at least one damping element connecting the two support members with the joint, wherein each of the two support members is connected to both the at least one damping element and the joint,
   wherein the at least one damping element is configured to deform plastically by a relative rotation between the two support members about the at least one rotational axis, and
   wherein at least one of the post insulators is connected to one of the at least one coupling device to damp rotation of the at least one of the post insulators about the at least one rotational axis; and
   adjusting the stiffness of the coupling device, by adding or removing at least one damping element connecting the two support members to or from the coupling device, or by changing configuration of at least one damping element connecting the two support members;

wherein the at least one damping element is configured to deform plastically by a relative rotation between the two support members about the at least one rotational axis.

15. The method according to claim 14, wherein the at least one damping element includes two damping elements arranged on opposing sides of the joint.

16. The method according to claim 14, wherein the at least one damping element includes four damping elements arranged on four sides of the joint.

17. The method according to claim 14, wherein the at least one damping element is substantially C-shaped.

18. The method according to claim 14, wherein the at least one damping element is substantially planar.

19. The method according to claim 14, wherein the at least one damping element is constituted by a single piece of material.

20. The method according to claim 14, wherein the at least one damping element is constituted by a stack of plates.

21. A high voltage support system comprising:
  a high voltage unit configured to handle a voltage of at least 100 kV;
  a support structure configured to support the high voltage unit on a support surface, wherein the support structure comprises a plurality of legs, wherein each of the plurality of legs comprises a lower post insulator and an upper post insulator;
  a coupling device connecting the lower post insulator with the upper post insulator, wherein the coupling device comprises:
    two support members comprising a first support member and a second support member, each of the first and the second support members having a substantially planar structure, the first support member being connected to the lower post insulator and the second support member being connected to the upper post insulator;
    a joint connecting the two support members and allowing relative rotation between the two support members about a rotational axis; and
    a first damping element separately connecting each of the two support members with the joint, each of the two support members extending from the first damping element towards the joint, wherein the first damping element is configured to deform plastically by a relative rotation between the two support members about the rotational axis.

22. The high voltage support system of claim 21, wherein the high voltage unit further comprises module supports, columns, and column supports, wherein the module supports are stacked on one another by the support columns, and wherein the module supports are supported on the columns via the column supports.

23. The high voltage support system of claim 21, wherein the high voltage unit comprises a high voltage direct current semiconductor valve structure.

24. The high voltage support system of claim 21, wherein the substantially planar structure of each of the first and the second support members is.

25. The high voltage support system of claim 21, wherein the high voltage unit has a rectangular cross-section and each of the plurality of legs is associated with a corner of the high voltage unit, and wherein the lower post insulator is longer in length than the upper post insulator.

* * * * *

UNITED STATES PATENT AND TRADEMARK OFFICE
CERTIFICATE OF CORRECTION

| | |
|---|---|
| PATENT NO. | : 10,900,533 B2 |
| APPLICATION NO. | : 16/615594 |
| DATED | : January 26, 2021 |
| INVENTOR(S) | : Axel Johansson et al. |

It is certified that error appears in the above-identified patent and that said Letters Patent is hereby corrected as shown below:

In the Claims

Claim 24, Column 14, Line 26; insert --a square plate-- after "second support members is".

Signed and Sealed this
Seventh Day of June, 2022

Katherine Kelly Vidal
*Director of the United States Patent and Trademark Office*